E. W. K'BURG.
GREASE CUP.
APPLICATION FILED DEC. 12, 1917.
1,348,362.
Patented Aug. 3, 1920.
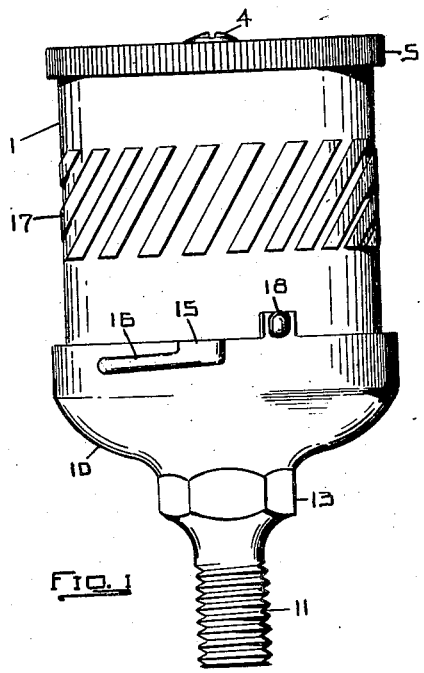
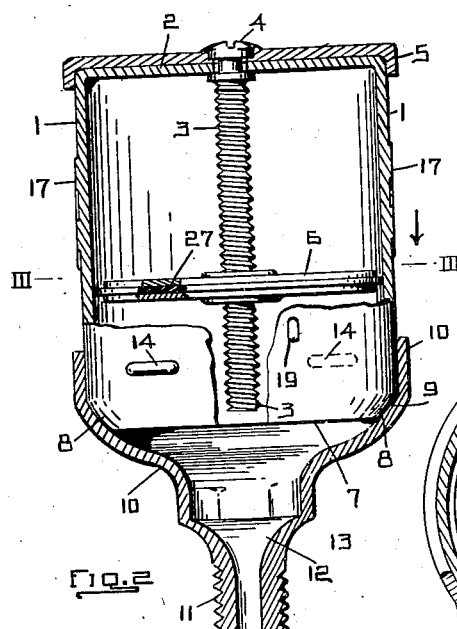
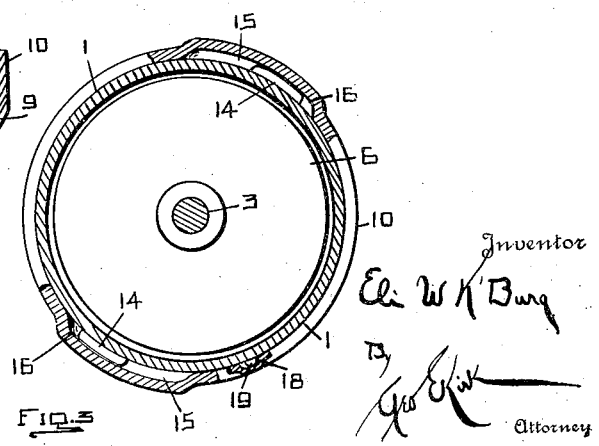
Inventor
Eli W K'Burg
By
Attorney

UNITED STATES PATENT OFFICE.

ELI W. K'BURG, OF TOLEDO, OHIO.

GREASE-CUP.

1,348,362.

Specification of Letters Patent.  Patented Aug. 3, 1920.

Application filed December 12, 1917.  Serial No. 206,827.

*To all whom it may concern:*

Be it known that I, ELI W. K'BURG, a citizen of the United States of America, residing at Toledo, Lucas county, Ohio, have invented new and useful Grease-Cups, of which the following is a specification.

This invention relates to force feed grease cups.

This invention has utility when embodied in quick assembly cups for hard oil lubrication devices.

Referring to the drawings:—

Figure 1 is a side elevation of an embodiment of the invention in a grease cup;

Fig. 2 is a medial section of the device of Fig. 1 and

Fig. 3 is a section on the line III—III Fig. 2.

The cup comprises the cap or cylindrical reservoir member 1 having an opening centrally of its closed end 2 in which is swiveled the threaded stem 3 having the screw head 4 anchored in the knurled rim skirted member 5 as an actuator for rotating the stem 3, thereby effecting reciprocation of the plunger 6 in the reservoir 1.

The reservoir 1 has the open end 7 tapered to form a seat 8 against the opposing tapered portion 9 of the base member 10. The base member 10 has the threaded portion 11 serving as a mounting for the assembled grease cup as a lubricating device unit. This base member 10 has the lubricant feeding way 12 therethrough and hexagonal portion 13 which may be engaged by a wrench in setting the combination firmly in position.

In this device the skirted member 5 is held against rotation as to the stem 3 as by the flattened or angular sides of the head 4 being seated and held by peening in such assembled relation. This skirted member 5, as well as the reservoir 1 and base 10 may be formed from sheet metal, thereby providing a rigid light weight structure of maximum capacity, substantial in hard wear as well as light of weight.

In assembling the reservoir 1 with the mounting 10, this is quickly and readily effected by causing the pair of projections 14 on the member 1 to register with the pair of ways 15 of the base member 10, and then forcing this filled grease reservoir 1, which has had its plunger 6 retracted therein axially of the stem 3, into the member 10.

With the parts thus assembled, angular movement of the reservoir 1 causes the projections 14, in their interengagement with the base 10, to ride along the wedge guideways 16, which wedge guideways not only supplement the holding of the members 1 and 10 in assembled relation but wedge the seat 8 of the reservoir 1 against the seat 9 of the base member 10. This angular motion or slight rotation of the member 1 may be readily effected by gripping the knurled or roughened portion 17 of the member 1.

With the parts thus assembled, it is only necessary, in the force feeding of the hard oil or grease, to give angular movement or rotation to the skirted member 5 in the same direction as the angular travel effecting the firm seating of the member 1. Accordingly, any frictional resistance to the travel of the plunger 6 supplements the initial packing between the seats 8 and 9, thereby automatically assisting in insuring a sealed joint between the reservoir 1 and the base 10.

This grease cup is especially designed for use in places subject to vibration, as in connection with motor vehicle work. To preclude possibility of accidental release of the reservoir 1 from the base 10, the base 10 is provided with the upstanding seat 18 into registry with which may move the projection 19 on the reservoir 1.

In the operation of a grease cup of this disclosure, a slight or positive reverse movement will allow for withdrawal of the reservoir 1, the skirted member 5 may be rotated for full retraction of the plunger 6. Then this reservoir member 1 may be filled with the hard oil, placed to have its projections in registering position with the ways of the base, and then, by a slight but positive right hand angular shifting, there is a wedging and locking of the parts in positive assembled relation. With the assembly thus completed, manual forcing of the feed of lubricant may occur at once or as desired by a rotating of the skirted member 5, which provides a flush top for the grease cup, so that in cleaning the automobile or in working about the vehicle, there is obviated any occasion for catching clothing or articles on the cup to disturb the cup or interfere with the labor being performed.

In the reciprocation of the plunger, its gasket 27 has such frictional engagement with the interior of the reservoir 1 that it is held from rotation and merely reciprocates therein.

What is claimed and it is desired to secure by Letters Patent is:

1. A grease cup base having a mounting stem, a grease reservoir mountable on said base to provide a single wall grease cup, the mounting and reservoir having endless annular opposing tapering seats, there being means adjacent said seats coacting as a wedge holder between the mounting and reservoir in impinging said tapering seats against each other and comprising a projection and an opposing wedge guide directly packing said mounting and reservoir at said seat against grease escape from the reservoir past said seats, a piston within the reservoir for applying grease pressure in the reservoir in the region of said seats in the expulsion of grease through the mounting stem, and means remote from the base and movable independently of the reservoir and base holding means for actuating said piston.

2. A grease cup base having a mounting having an inwardly tapering shoulder providing an endless seat, a grease reservoir having its open end inwardly beveled to form a tapering seat abutting said mounting seat on said base to provide a single wall grease cup, there being means adjacent said seats coacting as a wedge holder between the mounting and reservoir in impinging said wedge seats into nesting coaction for sealing the reservoir against grease escape past said seats, and grease expulsion means movable independently of the reservoir for applying pressure to the grease in the region of said seats in expelling grease from the cup at the mounting.

In witness whereof I affix my signature.

ELI W. K'BURG.